UNITED STATES PATENT OFFICE 2,683,659

HERBICIDES

Arthur H. Schlesinger and David T. Mowry, Dayton, Ohio, assignors to Monsanto Chemical Company, St. Louis, Mo., a corporation of Delaware No Drawing. Application September 26, 1950, Serial No. 186,921

5 Claims. (Cl. 71—2.5)

The present invention relates to herbicides and deals more particularly with methods for the general destruction of undesired plants.

A number of herbicides are known, a variety of organic and inorganic compounds having been suggested in the prior art for use as plant-killers. Among the disadvantages of known herbicides may be mentioned corrosive effect on equipment, chemical reactivity with other components customarily employed in agricultural sprays or powders, instability when exposed for long periods of time to ordinary atmospheric conditions, and soil instability, e. g., chemical reactivity with soil components and susceptibility to decomposition by soil micro-organisms, which results in loss of the active material. Thus, a herbicide possessing a free carboxy group may be substantially deactivated in highly alkaline soil by reaction with basic, salt-forming materials in such soils. Conversely, a herbicide having reactive basic substituents may be deactivated by reaction with acid constituents of acidic soils.

Now we have found that highly stable, non-corrosive herbicidal compositions are obtained by employing as the active ingredient a compound selected from the class consisting of malononitrile and the derivatives of malononitrile which have the general formula

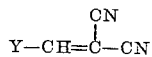

in which R and R' are selected from the class consisting of hydrogen, alkyl, aryl, cycloalkyl, —O.alkyl, —O-cycloalkyl, and —O.aryl radicals of from 1 to 8 carbon atoms, the furyl radical, and the thienyl radical.

Derivatives of malononitrile which we have found to possess very good herbicidal action may be classed as follows:

Compounds having the general formula

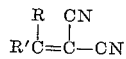

in which X is selected from the class consisting of hydrogen and alkyl, cycloalkyl, aryl and alkaryl radicals of from 1 to 8 carbon atoms. This class of compounds is easily prepared by reacting an aldehyde with malononitrile and includes, for example, ethylidenemalononitrile, 1-phenylethylidenemalononitrile, benzylidenemalononitrile, cyclohexylidenemalononitrile, isopropylidenemalononitrile, 1 - methylbutylidenemalononitrile, α - methylcuminylidenemalononitrile, diphenylmalononitrile, etc.

Another group comprises compounds having the general formula

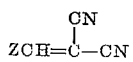

in which Y is selected from the class consisting of —O-alkyl and —O-aryl radicals of from 1 to 8 carbon atoms. This class of compounds is readily prepared by reacting an alkyl or aryl orthoformate with malononitrile in the presence of a dehydrating agent and includes, for example, methoxymethylenemalononitrile, ethoxymethylenemalononitrile, butoxymethylenemalononitrile, hexyloxymethylenemalononitrile, octyloxymethylenemalononitrile, phenoxymethylenemalononitrile, β-naphthyloxymethylenemalononitrile, etc.

Still another group of compounds which are useful for the present purpose has the general formula

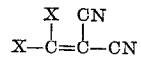

in which Z is selected from the class consisting of the furyl and thienyl radicals and derivatives thereof in which at least one nuclear hydrogen has been substituted by an alkyl radical of from 1 to 4 carbon atoms. This class of compounds includes furalmalononitrile and thenalmalononitrile.

The present malononitriles are effective herbicides over wide ranges of concentrations. The effectiveness may be measured by determining the inhibition of root growth as compared to similar untreated plants. The general usefulness of a herbicide may be measured by comparing the concentrations of a herbicide required to produce a certain inhibition on a broad-leafed plant with the concentrations of a herbicide required to produce the same inhibition on a narrow-leafed plant. For evaluation in many laboratories the cucumber has been adopted as a typical broad-leafed dicotyledonous plant for technical reasons, and wheat has been used as a standard narrow-leafed monocotyledonous plant. The general technique of evaluation of herbicides by growing seedlings in petri dishes has been described by Thompson, Swanson and Norman, Botanical Gazette, 107, 476–507 (1946).

The present invention is illustrated, but not limited, by the following examples:

Example I

Herbicidal activity of the nitriles listed in the table below was determined by germination of cucumber seeds for 4 days at a temperature of 76° F. in the presence of aqueous suspensions of each of the indicated chemicals at concentration of 100 p. p. m. Seventy-five seeds were used for each test. The results are expressed as per cent length of the primary roots in the presence of the chemical compared with the length of the primary roots of controls which had been germinated in water. The activity of two standard herbicides as obtained by the same test are included for comparison.

| Compound Tested | Percent Growth at 100 Parts Per Million |
| --- | --- |
| Malononitrile | 3 |
| Furalmalononitrile | 2 |
| Thenalmalononitrile | 3 |
| Ethoxymethylenemalononitrile | 10 |
| Benzylidenemalononitrile | 13 |
| 1-Phenylethylidenemalononitrile | 19 |
| 2,4-Dichlorophenoxyacetic acid | 6 |
| Isopropyl carbanilate | 14 |

The herbicidal efficiency of malononitrile and the present derivatives thereof, is remarkable, because as shown in the table given below nitriles do not generally possess great herbicidal efficiency. When tested as described above, aqueous suspensions of a random group of nitriles were found to have the following effects:

| Compound Tested | Percent Growth at 100 Parts per Million |
| --- | --- |
| Mesaconitrile | 51 |
| Succinonitrile | 86 |
| Phenylsuccinonitrile | 77 |
| Cyanoacetic acid | 65 |
| 4,4'-Dicyanostilbene | 82 |
| Dicyanoethyl Fumarate | 80 |
| Dicyanoethyl ether | 96 |
| Furfurylidene cyanoacetamide | 85 |

*Example II*

The present malononitrile compounds were tested with both cucumber and wheat seeds and the percentage of growth inhibition measured for various concentrations. The concentration of each compound which permitted 20 per cent of normal growth (80 per cent inhibition) was determined for seeds of cucumber and wheat, respectively. The following results, expressed as parts per million of the herbicide, were obtained:

| | Cucumber | Wheat | Ratio |
| --- | --- | --- | --- |
| Malononitrile | 18 | 17 | 1 |
| Furalmalononitrile | 23 | 59 | 2.5 |
| Thenalmalononitrile | 16 | 16 | 1 |
| Ethoxymethylenemalononitrile | 35 | 80 | 2.3 |
| Benzylidenemalononitrile | 35 | 100 | 3 |
| 1-Phenylethylidenemalononitrile [1] | 14 | 28 | 2 |

[1] P. p. m. for 50% growth used.

The nitriles are preferably applied by spraying aqueous suspensions of the same, this method affording an easy and inexpensive way of destroying plant growth. However, the present nitriles are likewise effective when applied as dusts, for example, in admixture with such carriers as clay, lime, talc, bentonite, pumice, fuller's earth, etc. The present compounds are soluble in the usual organic solvents and may be used in solution, e. g., in kerosene or benzene solution as herbicidal sprays.

The sprays or dusts may be used to destroy already existing plant growth by direct application to the undesirable plants, or they may be employed to prevent the plant growth by application to soils. When employed to prevent plant growth, for example in parking areas, highway abutments, railway yards, etc., they may be applied either as an aqueous spray or dust or they may be admixed with customarily employed temporary surfacing materials, e. g., oils, cinders, etc. The present invention thus provides a generally useful method of preventing and destroying undesirable plant growth.

Only small amounts of the present herbicidal materials need be employed. For general utility, concentrations of from, say, 0.1 part to 20 parts of the nitrile per hundred parts by weight of the carrier may be employed, and in this manner an acre of land may be freed of plants by application of only a few pounds of one of the present herbicides.

What we claim is:

1. The method of destroying undesirable plants which comprises applying to said plants a toxic quantity of a herbicidal composition including, as the active ingredient, a compound selected from the class consisting of malononitrile and derivatives of malononitrile, said derivatives having the formula

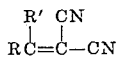

in which R is selected from the class consisting of the cyclopropyl, the furyl and the thienyl radicals and R' is selected from the class consisting of hydrogen and the methyl radical.

2. The method of destroying undesirable plants which comprises applying to said plants a herbicidal composition including 1-cyclopropylethylidenemalononitrile as the active ingredient.

3. The method of destroying undesired plants which comprises applying to said plants a toxic quantity of a herbicidal composition including malononitrile as the active ingredient.

4. The method of destroying undesired plants which comprises applying to said plants a toxic quantity of a herbicidal composition including furalmalononitrile as the active ingredient.

5. The method of destroying undesired plants which comprises applying to said plants a toxic quantity of a herbicidal composition including thenalmalononitrile as the active ingredient.

References Cited in the file of this patent

UNITED STATES PATENTS

| Number | Name | Date |
| --- | --- | --- |
| 2,472,347 | Sexton | June 7, 1949 |

OTHER REFERENCES

Nature, vol. 160 (1947), pages 296 and 297.